US010304135B1

(12) United States Patent  (10) Patent No.: US 10,304,135 B1
Colangelo  (45) Date of Patent: May 28, 2019

(54) SYSTEM AND METHOD FOR SINGLE PAGE PURCHASE LINK EMBEDDING

(71) Applicant: Patrick Colangelo, San Francisco, CA (US)

(72) Inventor: Patrick Colangelo, San Francisco, CA (US)

( * ) Notice: Subject to any disclaimer, the term of this patent is extended or adjusted under 35 U.S.C. 154(b) by 0 days.

(21) Appl. No.: 16/180,878

(22) Filed: Nov. 5, 2018

(51) Int. Cl.
  *G06Q 40/04* (2012.01)
  *G06F 17/30* (2006.01)
  *G06Q 20/36* (2012.01)
  *G06F 16/955* (2019.01)
  *G06Q 20/06* (2012.01)

(52) U.S. Cl.
  CPC ......... *G06Q 40/04* (2013.01); *G06F 16/9558* (2019.01); *G06F 17/30882* (2013.01); *G06Q 20/36* (2013.01); *G06Q 20/065* (2013.01); *G06Q 2220/00* (2013.01); *H04L 2209/56* (2013.01)

(58) Field of Classification Search
  CPC ...... G06Q 20/363; G06Q 40/04; G06Q 20/36; G06F 17/30882
  See application file for complete search history.

(56) References Cited

U.S. PATENT DOCUMENTS

2003/0033288 A1* 2/2003 Shanahan ........... G06F 17/3064
2015/0242897 A1* 8/2015 Dinardo, Jr. .......... H04W 12/08
  705/14.56

FOREIGN PATENT DOCUMENTS

CA  2694563 A1 * 8/2010 ............. G06Q 30/02

OTHER PUBLICATIONS

Wizard Internet Solutions: ShortCode: Popup Trigger, May 8, 2018, pp. 1-17. (Year: 2018).*
Hemalatha et al.: Online Shopping using Tagging, Mar. 20, 2015, 2015 IEEE International Conference on Engineering and Technology (ICETECH), India, pp. 1-5. (Year: 2015).*
Squarespace Help: Creating a text link, Sep. 12, 2018, pp. 1-4. (Year: 2018).*
Microsoft: Create a purchase order, Mar. 24, 2015, Microsoft Docs, pp. 1-5 (Year: 2015).*

* cited by examiner

*Primary Examiner* — Bijendra K Shrestha
(74) *Attorney, Agent, or Firm* — Quickpatents, LLC; Kevin Prince

(57) ABSTRACT

A system for embedding and displaying a quote link within a portion of text displayed on a client connected to a network includes a server with at least a processor, a database module, and a non-volatile storage system. A purchase request module requests a purchase quote from an exchange via the server over the network when a user of the client activates the quote link on the client. An offer display module displays the purchase quote and a purchase link on a purchase window when the purchase quote is received from the exchange. A transaction handling module makes the purchase on behalf of the user if the user clicks the purchase link displayed on the purchase window. The server utilizes pre-completed user information, including the user's wallet address, stored in the database module to affect the purchase on the user's behalf.

20 Claims, 4 Drawing Sheets

| Cust. No. | Name | Address | CSZ | Wallet ID |
|---|---|---|---|---|
| ... | ... | ... | ... | ... |
| 10429 | John Smith | 14725 Main St. | Topka, KS 20343 | 8a15ne4d-3d6c-6745-d282-da885h64pqf9 |
| ... | ... | ... | ... | ... |
| 22947 | Jacob Jones | Address | Sparks, NV 80951 | 3E53XjqK4Cxt71BGeP2VhpcotM8LZ853C8 |
| ... | ... | ... | ... | ... |

FIG. 2

SYSTEM AND METHOD FOR SINGLE PAGE PURCHASE LINK EMBEDDING

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to a purchase link display, and more particularly to display of purchase window that is associated with a text segment.

DISCUSSION OF RELATED ART

Today most people decide on what crypto currency, stocks, bonds, and other securities to buy from news and recommendations that they read and hear about online. The typical flow for a purchase often starts on Reddit, Twitter, Bitcointalk.com, or a blog article online, where that user reads about someone's take on the coin or security, or about news that has recently come out on the coin or security. The flow then proceeds to the user needing to lookup what exchanges that coin or security is listed on, typically on a coinmarketcap.com or a google search that reveals that this particular coin is listed on x handful of exchanges (most coins are listed on only a few exchanges as its very expensive to be listed on an exchange, and most people are only members of a few exchanges as well, resulting in lack of access to buy coins). Once the user finds out what exchange the coin is on, he now knows if he either has an account already or not. If he does, then he logs in (taking maybe 30 seconds to 1 minute), gets reacclimatized to that exchange's specific trading console UI (or User Interface; takes another 1 minute as they are all different), and then places his order. He then needs to keep his eyes on that site to see when and if it went through. If he doesn't have an account on that exchange, it's even more time-consuming, as he will have to go through a KYC (Know Your Customer) process and sign up process requiring uploading documents and often waiting days.

The market of exchanges is extremely fragmented today, with each one carrying only some coins and not others. This is different than the stock market where a brokerage account is opened online and users can see and buy every available stock. With crypto currencies there are dozens and dozens of exchanges with varying degrees of credibility and safety, all with their own arduous signup processes and their own selection of coins they choose to carry. Each exchange that is used results in the user must having different login credentials and/or different profile information, as well as the need to get comfortable with a completely different trading console UI since there is little to no regulation in the industry and no regulatory board.

Consequently, there is a need for a system that provides a method of circumventing much of the hassle of using different exchanges, and that lets users buy with one tap right from the page where the user learned about the coin and related news. The needed system would not require a new web page or window to be opened in order to display a purchase quote and link, but would rather allow the purchase quote to be displayed within the existing window and over any non-related text adjacent to the tagged text. The needed invention would further provide publishers with tools to easily find relevant purchase quotes to link to, and to report on and organize links used in a particular website, web page, or other published work. The present invention accomplishes these objectives.

SUMMARY OF THE INVENTION

The present device is a system for embedding and displaying a quote link within a portion of text, such as part of a larger message, displayed on a client connected to a network, such as the Internet or the like. The client may be a smart phone, laptop computer, desktop computer, tablet computer, or the like, used by a user. The quote link may be a text hyperlink, graphic image, moving image, or other contrasting portion of the text.

The system includes a server includes at least a processor, a database module, and a non-volatile storage system, such as a hard drive, cloud-based drive, network-attached storage, or a combination thereof.

A purchase request module running on the client is adapted to request a purchase quote from an exchange via the server over the network when a user of the client activates the quote link on the client. The purchase quote may be for a security, tradeable stock, crypto-currency, or the like, and the portion of text having the quote link may include a stock symbol, crypto-currency name, bond identifiers, fund names, or the like.

An offer display module running on the client is adapted to display the purchase quote and a purchase link on a purchase window, preferably adjacent to the portion of text, when the purchase quote is received from the exchange via the server through the network. Preferably the offer display module de-emphasizes any remaining text of the larger message.

A transaction handling module running on the client is adapted to allow the user to establish an account on the system, the account including a digital wallet address of the user, or to sign-in to his account with sign-in credentials previously established.

In some embodiments, the transaction handling module is further adapted to establish an account on the exchange for the user (if the user does not already have an account on the exchange) before making a purchase for the user on the exchange, such that the user's wallet address is used for payment on the exchange. In such an embodiment, the transaction handling module requests information directly from the user to establish the account on the exchange for the user, such as name, contact information, and payment information. The transaction handling system may be further adapted to attempt a purchase from the exchange by pooling funds first using the user's account at the exchange, and then by transferring funds from the user's account on the system to the exchange, and then by transferring funds from the user's wallet address to the user's account on the system and then to the exchange, until sufficient funds are available to make the purchase.

As such, in use, when the user activates the quote link on the client associated with the portion of text, the purchase request module requests the purchase quote associated with the quote link from the server through the network. The server thereafter sends the purchase quote to the client, the offer display module displaying on the client the purchase window with the purchase quote and purchase link. The transaction handling module then makes the purchase on behalf of the user if the user clicks the purchase link displayed on the purchase window. The server utilizes pre-completed user information, including the user's wallet address, stored in the database module to affect the purchase on the user's behalf.

Preferably the server further provides a search interface for allowing the user to use the database module to search for tags associated with the securities stored in the non-volatile storage system. The server further provides code fragments to use for tagging the portion of the text to enable purchasing of the security, so that the user may easily include such tags on his website, blog posts, or the like.

Preferably the server further includes a reporting module adapted to request a user's website, scan the user's website for tags related to securities, and display a list of all of the securities linked to on the user's website.

In some embodiments, the system collects purchase quotes from a plurality of exchanges and displays the purchase quotes in accordance to a preselected display preference setting, such as certain preferred exchanges being listed above non-preferred exchanges.

In use, thanks to basic Natural Language Processing (NLP), using a massive lookup table of all coin names and their symbols, as well as an indexer that indexes the pages of these sites and auto identifies any words that match the coin names and symbols with their respective purchase and info modals, the system highlights the name of the coin and/or its symbol in the text of the page (this works for stocks too, so stock names and stock ticker symbols would be treated similarly). When a user hovers on the link or holds down on the link on a mobile device, he sees a modal purchase window appear that lets him buy that coin right on the spot, and to see more information about the offering such as competitors, graph, price, recent news, other people's comments, etc. It's similar to an invisible layer resting on all websites that lets the user buy cryptocurrency and stocks right on the spot with one tap or click, with no need to go look up which exchange offers the coin, and then login or signup and wait, and then buy from there.

For NLP, a basic named entity lookup strategy is used, and simple additions like nearest neighbor search and rarified terminology extraction and other techniques that analyze the words and lines around that coin name or symbol ensures it is really about crypto and not something else.

There can be extra security on the purchase window if necessary, like 2-factor authentication, etc., when tapping to make a trade, if the user wants so they feel secure.

The layer works both as an SDK (Software Development Kit) partnered with the websites that want to use it, and also works as a chrome app or other external browser or mobile app that a user could download to see the highlighting functionality on any site (whether or not that site is partnered with us).

For a first time user, the first time that they hold down and see the modal purchase window they are asked to create an account that includes their credentials. They go through a KYC process (know your customer) and either connect their own wallet address to deposit coins into their account, if they want, or receive a new wallet address from the purchase window that they can deposit funds into. The system then sends the data of this new user to the necessary exchanges, so they know who to make the trades for. If the user is not yet a member of one of our partner exchanges, then this information hand off makes them a new user automatically on that exchange, and/or the system asks that the user signup separately with that specific exchange and then authenticate on the purchase window layer using their exchange credentials so that the system knows they're now a user of that exchange.

Once authenticated, the purchase window layer gets read access to all the prices of all the coins on each exchange in real-time, and read access of the user's own coin balance and coins that they have in each exchange in real-time. The purchase window is a modal on top of the page, so that there is no need to refresh the page, load a different URL, or the like, thereby fostering a seamless experience with the page.

Then when a user hovers over a coin link, for example, the system shows the coin price from the exchange that offers it (if multiple exchanges offer then the system can show multiple links, or only best price one, or our favorite exchange, etc., based on the preselected display preference settings) and the system lets the user know if they have enough coin from that exchange to make the purchase or not.

If they don't have enough coin on that exchange to make the purchase, the purchase window layer can prompt the user to auto send enough coin from their layer wallet balance to the wallet they have on that exchange, and then automatically make the trade on that exchange once the coin arrives on that exchange. In this way the user can do everything in just one tap of the purchase link, even if they don't have enough coin on the relevant exchange. I refer to this new concept as "one-tap transfer and trade execution" (OTTT).

When the user taps to make the trade after entering how much they want to buy (or sell), the purchase window layer then instantly sends the order to that exchange and the exchange executes it. The user is updated via email of the trade progress and outcome.

The communication between the purchase window layer and the exchange needs to be real-time and substantially instant. And separately, the system constantly updates in real-time the list of names and symbols in the lookup table for the partner platforms to highlight in their text as well.

In some embodiments, the purchase window layer itself is its own exchange, executing trades on its own rather than sending coin and information to an exchange to have them execute it.

For coins (Initial Coil Offerings, or ICOs) that are not yet listed on exchanges, the system obtains the wallet address and conversion price directly from that ICO company's website and then brokers the transaction by sending the user's crypto directly to the ICO company's wallet, giving the user a unique redemption code to redeem their new coin when it is issued on the respective new ICO company's website.

The present invention is a system that provides a method of tagging text that is related to a purchase quote, and then to display and/or play the purchase quote adjacent to the tagged text, without changing the layout of the text or having to make room for a media player. The present system accommodates various types of visual tagging of text, and allows for the display or playing of various types of purchase quotes, such as video, audio, still images, animated images, or the like. The present invention does not result in a new web page or window being opened in order to display or play the purchase quote, but rather allows the purchase quote to be displayed or played within the existing window and over the non-related text adjacent to the tagged text. The needed system provides publishers with tools to easily find relevant purchase quotes to link to, and to report on and organize links used in a particular website, web page, or other published work. Other features and advantages of the present invention will become apparent from the following more detailed description, taken in conjunction with the accompanying drawings, which illustrate, by way of example, the principles of the invention.

DESCRIPTION OF THE DRAWINGS

FIG. 2 is a diagram of sample records from a database of system accounts;

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
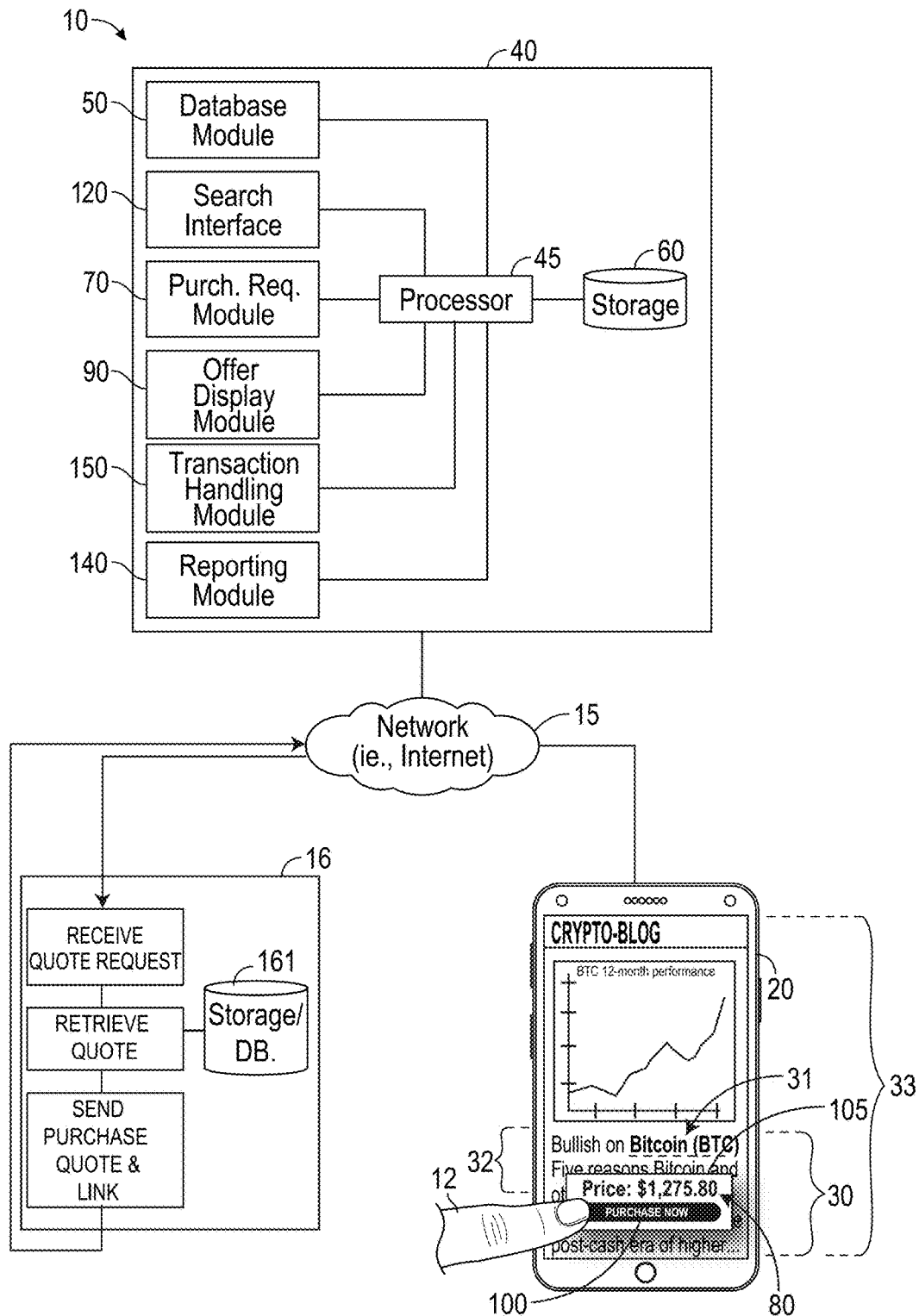
FIG. 1 is a diagram of a system of the invention, illustrating a server connected through a network to a client and at least one exchange.

FIG. 1 illustrates a system 10 for embedding and displaying a quote link 31 within a portion of text 30, such as part of a larger message 33, displayed on a client 20 connected to a network 15, such as the Internet or the like. The client 20 may be a smart phone, laptop computer, desktop computer, tablet computer, or the like, used by a user 12 (FIG. 1B). The quote link 20 may be a text hyperlink, graphic image, moving image, or other contrasting portion of the text 30.

A server 40 includes at least a processor 45, a database module 50, and a non-volatile storage system 60, such as a hard drive, cloud-based drive, network-attached storage, or a combination thereof.

A purchase request module 70 running on the client 20 is adapted to request a purchase quote 80 from an exchange 16 via the server 40 over the network 15 when a user 12 of the client 20 activates the quote link 31 on the client 20. The purchase quote 80 may be for a security, tradeable stock, crypto-currency, or the like, and the portion of text 30 having the quote link 31 may include a stock symbol, crypto-currency name, bond identifiers, fund names, or the like. The system 10 may also be adapted for use with services or products (not shown) instead of commodities or securities.

An offer display module 90 running on the client 20 is adapted to display the purchase quote 80 and a purchase link 100 on a purchase window 105, preferably adjacent to the portion of text 30, when the purchase quote 80 is received from the exchange 16 via the server 40 through the network 15. Preferably the offer display module 90 de-emphasizes any remaining text 32 of the larger message 33.

A transaction handling module 150 running on the client 20 is adapted to allow the user 12 to establish an account 160 (FIG. 2) on the system 10, the account 160 including a digital wallet address 13 of the user 12, or to sign-in to his account 160 with sign-in credentials previously established.

In some embodiments, the transaction handling module 150 is further adapted to establish an account 161 on the exchange 16 for the user 12 (if the user 12 does not already have an account 161 on the exchange 16) before making a purchase for the user 12 on the exchange 16, such that the user's wallet address 13 is used for payment on the exchange 16. In such an embodiment, the transaction handling module 150 requests information directly from the user 12 to establish the account 161 on the exchange 16 for the user 12, such as name, contact information, and payment information. The transaction handling system 150 may be further adapted to attempt a purchase from the exchange 16 by pooling funds first using the user's account 161 at the exchange 16, and then by transferring funds from the user's account 160 on the system 10 to the exchange 16, and then by transferring funds from the user's wallet address 13 to the user's account 160 on the system 10 and then to the exchange 16, until sufficient funds are available to make the purchase.

As such, in use, when the user 12 activates the quote link 31 on the client 20 associated with the portion of text 30, the purchase request module 70 requests the purchase quote 80 associated with the quote link 31 from the server 40 through the network 15. The server 40 thereafter sends the purchase quote 80 to the client 12, the offer display module 90 displaying the purchase window 105 with the purchase quote 80 and purchase link 100 on the client 20. The transaction handling module 150 then makes the purchase on behalf of the user 12 if the user 12 clicks the purchase link 100 displayed on the purchase window 105. The server 40 utilizes pre-completed user information 110, including the user's wallet address 13, stored in the database module 50 to affect the purchase on the user's behalf.

Figure 3:
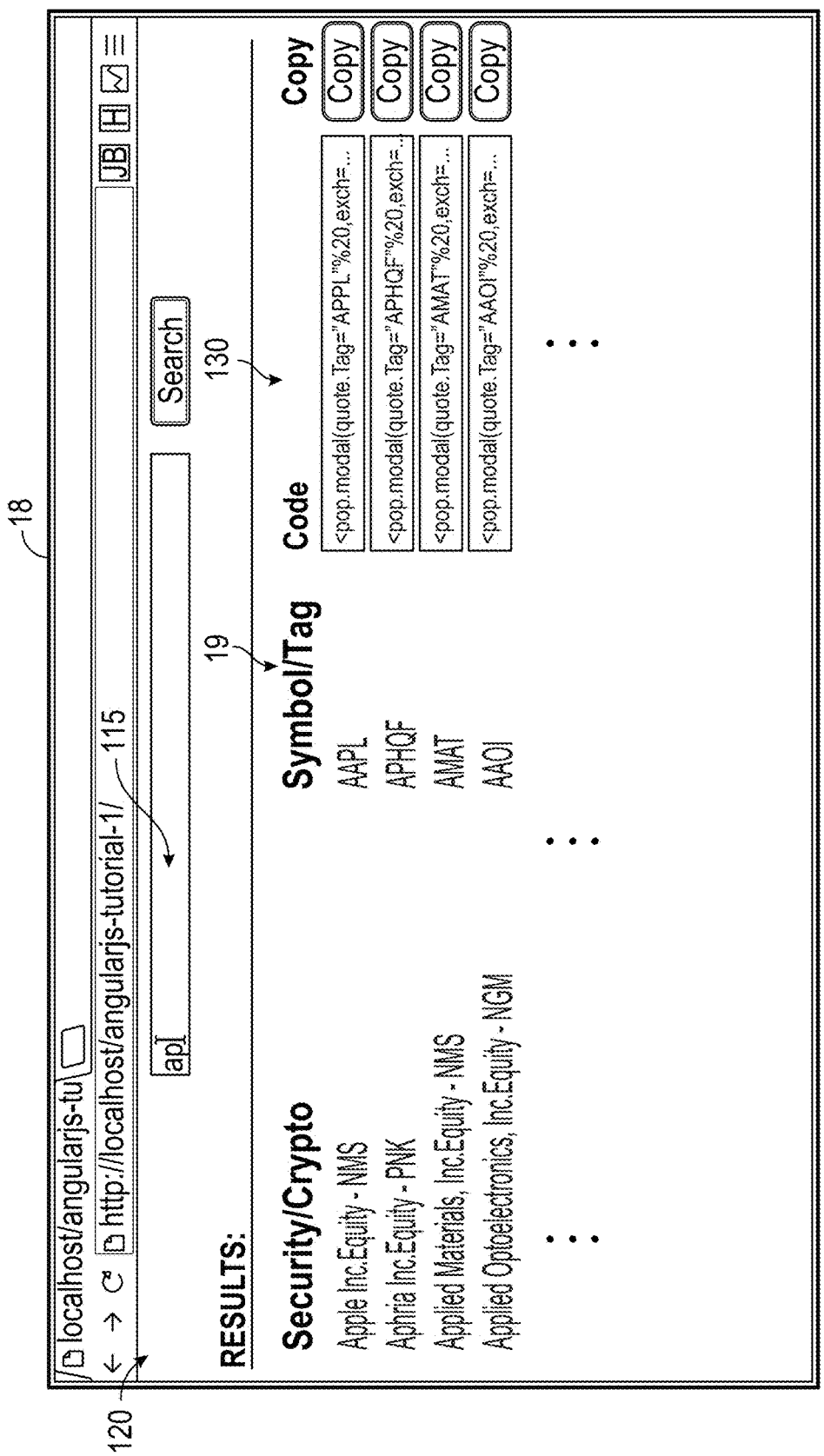
FIG. 3 is a client display screen showing a clip search interface of the invention.

Preferably the server 40 further provides a search interface 120 (FIG. 3) for allowing the user 12 to use the database module 50 to search for tags 19 associated with the securities stored in the non-volatile storage system 60. The server 40 further provides code fragments 130 to use for tagging the portion of the text 30 to enable purchasing of the security.

Figure 4:
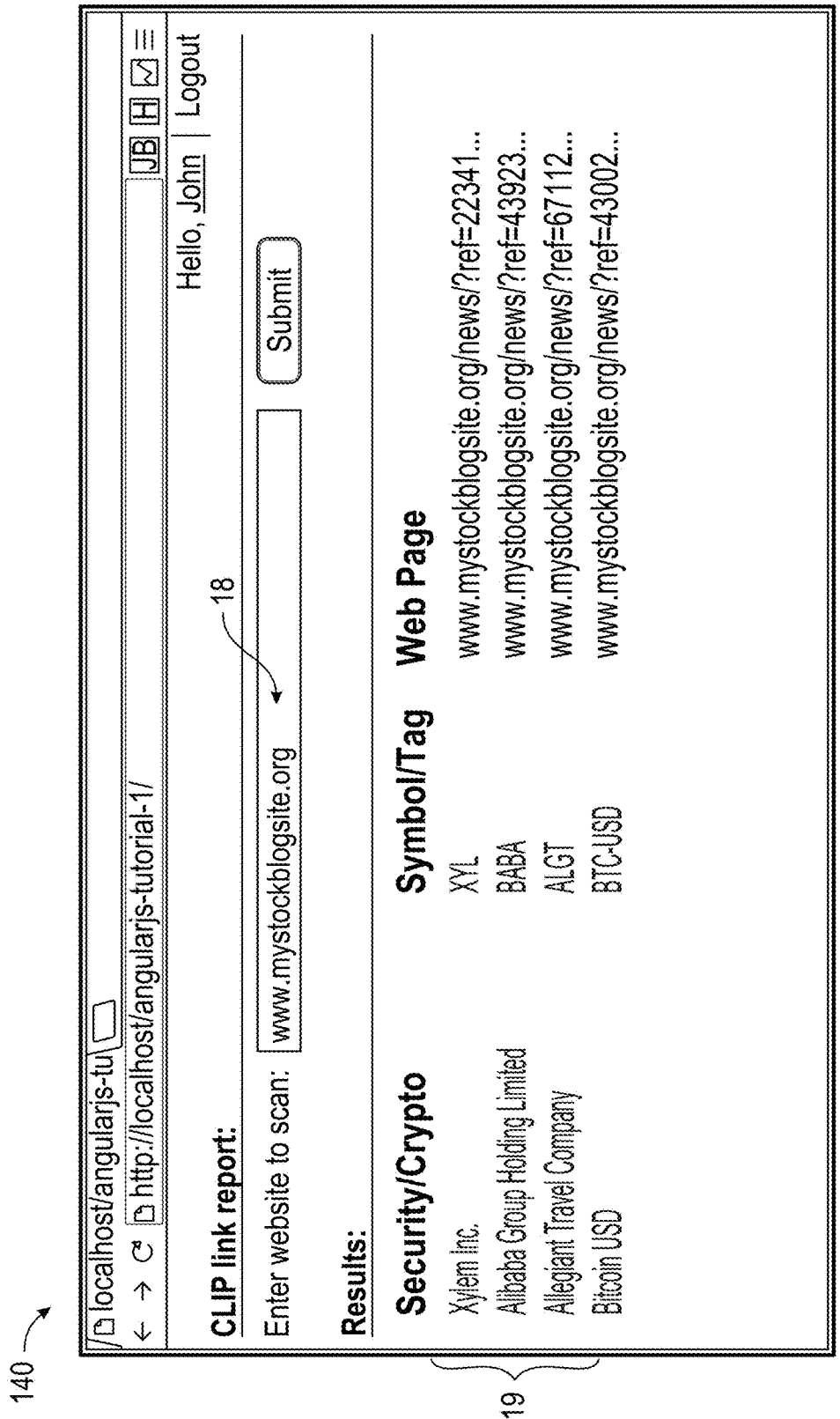
FIG. 4 is a client display screen showing a reporting module interface of the invention.

Preferably the server 40 further includes a reporting module 140 (FIG. 4) adapted to request a user's website 18, scan the user's website 18 for tags 19 (which could be coin names, stock names, company names, trademarks, product names, stock symbols, coin symbols, hashtags, or the like) related to securities, and display a list of all of the securities linked to on the user's website 18.

In some embodiments, the system 10 collects purchase quotes 80 from a plurality of exchanges 16 and displays the purchase quotes 80 in accordance to a preselected display preference setting, such as certain preferred exchanges 16 being listed above non-preferred exchanges 16.

In use, thanks to basic Natural Language Processing (NLP), using a massive lookup table of all tags 19 and their symbols, as well as an indexer that indexes the pages of these sites 18 and auto identifies any words that match the tags 19 and symbols with their respective purchase links 100 and info purchase windows 105 or modals, the system 10 highlights the tag/name 19 of the coin and/or its symbol in the text 30 of the page (this works for stocks too, so stock names and stock ticker symbols would be treated similarly). When the user 12 hovers on the link 31 or holds down on the link 31 on a mobile device, he sees a modal purchase window 105 appear that lets him buy that coin right on the spot, and to see more information about the offering such as competitors, graph, price, recent news, other people's comments, etc. It's similar to an invisible layer resting on all websites 18 that lets the user buy cryptocurrency and stocks right on the spot with one tap or click, with no need to go look up which exchange 16 offers the coin, and then login or signup and wait, and then buy from there.

For NLP, a basic named entity lookup strategy is preferably used, and simple additions like nearest neighbor search and rarified terminology extraction and other techniques that analyze the words and lines around that coin name or symbol ensures it is relevant (concerns crypto or stocks and not something else).

There can be extra security on the purchase window 105 if necessary, like 2-factor authentication, etc., when tapping to make a trade, if the user 12 wants so they feel secure.

The purchase window 105 works both as an SDK partnered with the websites that want to use it, and also works as a Chrome app or other external browser or mobile app that a user could download to see the highlighting functionality on any site (whether or not that site is partnered officially).

For a first time user 12, the first time that they hold down the quote link 80 and see the modal purchase window 105 they are asked to create an account 160 that includes their credentials. They go through a KYC process (know your customer) and either connect their own wallet address 13 to deposit coins into their account 160, if desired, or they receive a new wallet address from the purchase window 105 that they can deposit funds into. The system 10 then sends the user information 110 to the necessary exchange(s) 16, so they know who to make the trades for. If the user 12 is not yet a member of one of the partner exchanges 16, then this information hand-off makes them a new user automatically on that exchange, and/or the system 10 asks that the user signup separately with that specific exchange 16 and then authenticate on the purchase window layer 105 using their exchange credentials so that the system 10 knows they're now a user of that exchange having the exchange account 161.

Once authenticated, the purchase window layer 105 gets read access to all the prices of all the coins on each exchange 16 in real-time, and read access of the user's own coin balance and coins that they have in each exchange 16 in real-time.

Then when a user 12 hovers over a coin link 31, for example, the system shows the coin price from the exchange 16 that offers it (if multiple exchanges offer then the system can show multiple links 31, or only the lowest priced link, or a favorite exchange 16, etc., based on the preselected display preference settings) and the system 10 lets the user 12 know if they have enough coin from that exchange 16 to make the purchase or not. The purchase window 105 is a modal on top of the page, so that there is no need to refresh the page, load a different URL, or the like, thereby fostering a seamless experience with the page.

If they don't have enough coin on that exchange 16 to make the purchase, the purchase window layer 105 prompts the user 12 to auto send enough coin from their layer wallet balance to the wallet they have on that exchange 16, and then automatically makes the trade on that exchange 16 once the coin arrives on that exchange 16. In this way the user 12 can do everything in just one tap of the purchase link 100, even if they don't have enough coin on the relevant exchange 16. I refer to this new concept as "one-tap transfer and trade execution" (OTTT).

When the user 12 taps to make the trade after entering how much they want to buy (or sell), the purchase window layer 105 then instantly sends the order to that exchange 16 and the exchange executes it. The user 12 is updated via email of the trade progress and outcome.

The communication between the purchase window layer 105 and the exchange 16 is real-time and substantially instantaneous, subject to network congestion and speed. And separately, the system 10 constantly updates in real-time the list of names and symbols in the database module 50 for partner platforms to highlight in their text as well.

In some embodiments, the purchase window layer 105 itself is its own exchange, executing trades on its own rather than sending coin and information to an exchange 16 to have them execute it.

For coins (ICOs) that are not yet listed on exchanges 16, the system 10 obtains the wallet address 13 and conversion price directly from that ICO company's website and then brokers the transaction by sending the user's crypto funds directly to the ICO company, giving the user 12 a unique redemption code (not shown) to redeem their new coin when it is issued on the respective new ICO company's website.

While a particular form of the invention has been illustrated and described, it will be apparent that various modifications can be made without departing from the spirit and scope of the invention. For example, the larger message 30 and the portion 31 of the larger message 30 are contemplated herein as being text-based, but the system 10 can also be used to tag images or other elements displayed on a screen to activate the purchase quote 25. Alternately, the purchase quote 25 may be played within a virtual reality (VR) or augmented reality (AR) environment, when the portion 31 of the larger message 30, or some other trigger item in the VR or AR scene, is selected by the user 12. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above.

The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A system for embedding and displaying a quote link within a portion of text on a client connected to a network, comprising:
   a server, a database module, and a non-volatile storage system;
   a purchase request module running on the client and adapted to request a purchase quote from an exchange via the server over the network when a user of the client activates the quote link on the client;
   an offer display module running on the client and adapted to display the purchase quote and a purchase link on a purchase window when the purchase quote is received from the exchange via the server through the network; and
   a transaction handling module running on the client and adapted to allow the user to sign-in to his account with sign-in credentials and, if no account exists for the user, to then establish an account on the system for the user, the account including a digital wallet address of the user;
   whereby when the user activates the quote link on the client associated with the portion of text, the purchase request module requests the purchase quote associated with the portion of the text from the server through the network, the server thereafter sending the purchase quote to the client, the offer display module displaying the purchase window with the purchase quote and the purchase link on the client, the transaction handling module then making the purchase on behalf of the user if the user clicks the purchase link displayed on the purchase window, the server utilizing pre-completed user information including the user's wallet address stored in the database module to effect the purchase on the user's behalf.

2. The system of claim 1 wherein the portion of text occurs within a larger message and the portion of text is visually tagged, the offer display module displaying the purchase window adjacent the tagged text.

3. The system of claim 2 wherein in addition to the offer display module displaying the purchase window adjacent the tagged text, the offer display module de-emphasizes any remaining text of the larger message.

4. The system of claim 1 wherein the purchase quote is for a security.

5. The system of claim 4 wherein the security is a tradeable stock.

6. The system of claim 4 wherein the security is a crypto-currency.

7. The system of claim 5 wherein the portion of text forming the quote link is a stock symbol.

8. The system of claim 6 wherein the portion of text forming the quote link is a crypto-currency name.

9. The system of claim 4 wherein the server further provides a search interface for allowing users to use the database module to search for tags associated with the securities stored in the non-volatile storage system, the server further providing code fragments to use for tagging the portion of text to enable purchasing of the security.

10. The system of claim 4 wherein the server further includes a reporting module adapted to request a user's website, scan the user's website for tags related to securities, and display a list of all of the securities linked to on a user's website.

11. The system of claim 4 wherein the system collects purchase quotes from a plurality of exchanges and displays the purchase quotes in accordance to a preselected display preference setting.

12. The system of claim 1 wherein the transaction handling module is further adapted to establish an account on the exchange for the user before making a purchase for the user on the exchange, whereby the user's wallet address is used for payment on the exchange.

13. The system of claim 12 wherein the transaction handling module requests information directly from the user to establish the account on the exchange for the user.

14. The system of claim 13 wherein the transaction handling module is adapted to attempt a purchase from the exchange by pooling funds first using the user's account at the exchange, and then by transferring funds from the user's system account to the exchange, and then by transferring funds from the user's wallet address to the user's system account and then to the exchange, until sufficient funds are available to make the purchase.

15. A processor-implemented method for embedding and displaying a quote link within a portion of text on a client connected to a network, comprising the steps:
   providing a server, a database module, a non-volatile storage system, a purchase request module running on the client, an offer display module running on the client, and a transaction handling module running on the client;
   visually differentiating the portion of the text to indicate that a purchase quote is associated therewith;
   a user of the client activating the quote link on the client for the purchase quote;
   the server receiving the request for the purchase quote from the client through the network, receiving one or more purchase quotes from one or more exchanges via the network, and sending one of the purchase quotes to the client in accordance with a preselected display preference setting;
   the offer display module displaying the purchase quote and a purchase link adjacent the portion of text on the client;

the user selecting the purchase link displayed on the purchase window if desiring to purchase the security, thereafter the transaction handling module making a purchase on behalf of the user utilizing pre-completed user information including a user's wallet address stored in the database module.

16. The processor-implemented method of claim 15 further including the step:
the offer display module de-emphasizing any remaining text outside of the portion of text that is tagged and the purchase quote that is displayed.

17. The processor-implemented method of claim 15 further including the steps:
the server providing a search interface;
the user using the search interface to search the database for tags associated with the securities stored in the non-volatile storage system;
the server providing code fragments to the user for tagging a portion of text to enable purchase of the security.

18. The processor-implemented method of claim 15 further including the steps:
the server further including a reporting module adapted to request a user's web site;
the user entering his website URL into the reporting module; and
the server scanning the user's website for tags related to securities and displaying a list of all of the securities linked to on any web page on the website.

19. The processor-implemented method of claim 15 further including the steps:
the system collecting purchase quotes from a plurality of exchanges and displaying the purchase quotes in accordance to the preselected display preference setting.

20. The processor-implemented method of claim 15 further including the steps:
the transaction handling module requesting information directly from the user to establish an account on the exchange for the user;
establish the account on the exchange for the user before making a purchase for the user on the exchange, whereby the user's wallet address is used for payment on the exchange;
the transaction handling module attempting a purchase from the exchange by pooling funds first using the user's account at the exchange, and then by transferring funds from the user's system account to the exchange, and then by transferring funds from the user's wallet address to the user's system account and then to the exchange, until sufficient funds are available to make the purchase.

* * * * *